United States Patent [19]

Tsukamoto et al.

[11] Patent Number: 4,698,975

[45] Date of Patent: Oct. 13, 1987

[54] ENGINE-OPERATED MACHINE

[75] Inventors: Teisuke Tsukamoto; Shinichi Morohoshi, both of Saitama; Tetsuo Iida, Kanagawa; Yuji Kishizawa; Shoichi Kato, both of Saitama, all of Japan

[73] Assignee: Honda Giken Kogyo Kabushiki Kaisha, Tokyo, Japan

[21] Appl. No.: 754,888

[22] Filed: Jul. 15, 1985

[30] Foreign Application Priority Data

| | | | |
|---|---|---|---|
| Jul. 16, 1984 | [JP] | Japan | 59-147323 |
| Jul. 16, 1984 | [JP] | Japan | 59-107423[U] |
| Jul. 16, 1984 | [JP] | Japan | 59-107425[U] |
| Jul. 16, 1984 | [JP] | Japan | 59-107426[U] |
| Jul. 17, 1984 | [JP] | Japan | 59-107887[U] |
| Jul. 18, 1984 | [JP] | Japan | 59-108659[U] |
| Jul. 19, 1984 | [JP] | Japan | 59-109985[U] |

[51] Int. Cl.[4] ........................ H02P 9/04; F02B 63/00

[52] U.S. Cl. .......................................... 60/721; 123/2; 290/1 A

[58] Field of Search .............. 123/2; 290/1 A; 60/721

[56] References Cited

U.S. PATENT DOCUMENTS

| | | | |
|---|---|---|---|
| 277,954 | 9/1982 | Mizushima . | |
| 3,259,752 | 10/1963 | Honda . | |
| 4,098,077 | 2/1977 | Edmaier et al. . | |
| 4,117,342 | 9/1978 | Melley, Jr. | 290/1 A |
| 4,122,353 | 10/1978 | Noguchi | 290/1 A |
| 4,293,756 | 10/1981 | Hoyt, Jr. et al. | 290/1 A |
| 4,495,901 | 1/1985 | Nannini et al. | 290/1 A |
| 4,595,841 | 3/1984 | Yaguchi . | |
| 4,608,946 | 5/1984 | Tanaka et al. . | |

FOREIGN PATENT DOCUMENTS

| | | | |
|---|---|---|---|
| 52-65725 | 5/1977 | Japan . | |
| 52-23654 | 5/1977 | Japan . | |
| 55-24344 | 6/1980 | Japan . | |
| 56-54450 | 12/1981 | Japan . | |
| 57-186630 | 11/1982 | Japan . | |
| 58-22988 | 5/1983 | Japan . | |
| 58-137833 | 9/1983 | Japan . | |
| 0197417 | 11/1983 | Japan | 290/1 A |
| 0197418 | 11/1983 | Japan | 290/1 A |
| 2141781 | 5/1984 | United Kingdom . | |

*Primary Examiner*—Allan M. Ostrager
*Attorney, Agent, or Firm*—Armstrong, Nikaido, Marmelstein & Kubovcik

[57] ABSTRACT

An engine-operated machine such as an electric generator includes a box-shaped casing, an engine disposed in an upper portion of the casing, a machine unit disposed in a lower portion of the casing, and a power transmission assembly by which the engine is operatively connected to the machine unit. The box-shaped casing includes a casing body having front and rear openings, a pair of upper doors mounted on the casing body for opening and closing upper portions of the front and rear openings, respectively, a pair of lower doors mounted on the casing body below the upper doors for opening and closing lower portions of the front and rear openings, respectively, independently of the upper doors, and a pair of screen doors mounted on the casing body inwardly of the lower doors, respectively, for opening and closing the lower portions of the front and rear openings, respectively. A fuel tank is slidably removably disposed in the casing adjacent to the machine unit. When in operation, the upper and screen doors are closed and the lower doors are open. The closed screen doors protect the internal mechanism from being tampered with or other forms of attack. The engine-operated machine is of a small height, highly compact, and small in size.

8 Claims, 15 Drawing Figures

ENGINE-OPERATED MACHINE

BACKGROUND OF THE INVENTION

1. Field of the invention:

The present invention relates to an engine-operated machine composed of an engine and a machine unit such as an electric generator, a compressor, a pump or the like driven by the engine, the engine and the machine unit being housed in a soundproof casing.

2. Description of the Prior Art:

Engine-operated machines for outdoor use, such as engine-powered electric generators used as emergency power supplies on streets, are basically required to take up a small installation space, to prevent the entry of rain, wind, and undesirable foreign matter when not in operation, and to protect the internal mechanism from failures due to attack such as tampering by passerbys when in operation.

Conventional engine-operated machines are disclosed in Japanese Utility Model Publications Nos. 52-23654 and 58-22988, and Japanese Laid-Open Utility Model Publication No. 57-186630, for example. The machine revealed in Japanese Utility Model Publication No. 52-23654 is however open to attack as by passerbys when in operation. The other disclosed machines occupy a relatively large space for installation since the engine and the mechanism are disposed parallel to each other.

The present invention has been made in an effort to eliminate the difficulties with the prior-art engine-operated machines.

SUMMARY OF THE INVENTION

Accordingly, it is an object of the present invention to provide an engine-operated machine which meets the basic requirements thereof, i.e., takes up a small installation space, prevents rain, wind, and unwanted foreign matter from entering the machine when not in operation, and has a protective structure for the internal mechanism to guard against failures due to attack as by passerbys when in operation.

Another object of the present invention is to provide an engine-operated machine which has as low a height as possible, is compact, and small in size.

Still another object of the present invention is to provide an engine-operated machine which can conveniently be stored, transported, installed against a wall, and is portable.

A still further object of the present invention is to provide an engine-operated machine which can easily be refueled by simply replacing a fuel tank.

According to the present invention, there is provided an engine-operated machine including a box-shaped casing including a casing body having front and rear openings, at least a pair of upper doors mounted on the casing body for opening and closing the front and rear openings, respectively, at least a pair of lower doors mounted on the casing body below the upper doors for opening and closing the front and rear openings, respectively, independently of the upper doors, and a pair of screen doors mounted on the casing body inwardly of the lower doors, respectively, for opening and closing the front and rear openings, respectively, an engine having an output shaft and disposed in a lower portion of the box-shaped casing, a machine unit having an input shaft and disposed in an upper portion of the box-shaped casing, and a power transmission assembly by which the input shaft of the machine unit is operatively coupled to the output shaft of the engine.

According to the present invention, there is also provided an engine-operated machine including a box-shaped casing including a casing body having a pair of side panels and front and rear openings therebetween, and at least a pair of doors mounted on the casing body for opening and closing the front and rear openings, respectively, an engine having an output shaft and disposed in a lower portion of the box-shaped casing, the engine having a cylinder tilted toward one of the side panels, a machine unit having an input shaft and disposed in an upper portion of the box-shaped casing, and a power transmission assembly by which the input shaft of the machine unit is operatively coupled to the output shaft of the engine.

Further according to the present invention, there is provided an engine-operated machine including a box-shaped casing including a bed dividing the interior thereof into upper and lower chambers, and a fuel tank disposed above the bed in the upper chamber, the casing including a casing body having an opening adjacent to the fuel tank and a cover mounted on the casing body for opening and closing the opening, the fuel tank being slidably movable into and out of the upper chamber with the door being open.

The above and further objects, details and advantages of the present invention will become apparent from the following detailed description of a preferred embodiment thereof, when read in conjunction with the accompanying drawings.

DESCRIPTION OF THE PREFERRED EMBODIMENT

Figure 1:
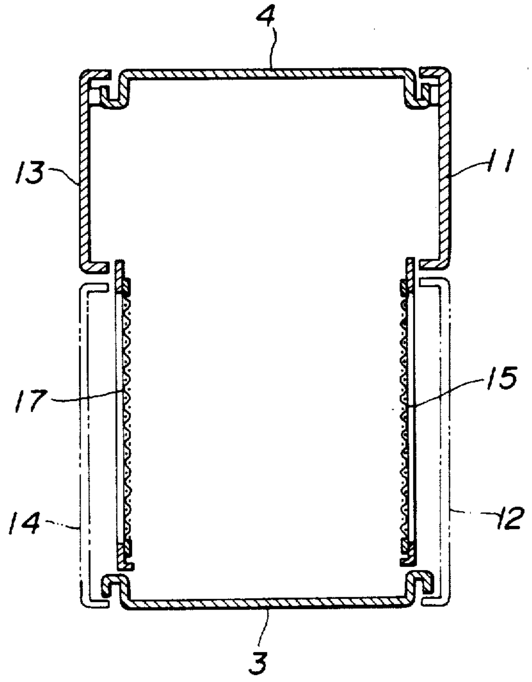
FIG. 1 is a vertical cross-sectional view of a box-shaped casing of an engine-operated machine according to the present invention.

As shown in FIGS. 1 through 8, an engine-operated machine according to the present invention has a box-shaped casing 1 of a soundproof construction in the form of a vertically elongate rectangular parallelepiped including a casing body 2 composed of a lower panel 3, an upper panel 4, and a pair of side panels 5, 6. The casing 1 also includes an upper door 11 and a lower door 12 hinged at their side edges to the casing body 2 so as to open and close the front opening of the casing body 2. Similarly, the casing 1 includes an upper door 13 and a lower door 14 hinged at their side edges to the casing body 2 so as to open and close the rear opening of the casing body 2. The lower doors 12, 14 are vertically longer than the upper doors 11, 13 for covering more than lower halves of the front and rear openings of the casing body 2. The upper and lower doors 11, 12 and 13, 14 are arranged such that their outer surfaces lie substantially flush with each other when closed.

Front and rear screen doors 15, 17 made of metal mesh are hinged to the casing body 2 inwardly of the lower doors 12, 14 so as to serve as protective covers for the internal mechanism of the electric generator. The upper doors 11, 13, the lower doors 12, 14, and the screen doors 15, 17 can be locked and unlocked by suitable locks. More specifically, the upper doors 11, 13 and the screen doors 15, 17 can be engaged and held in the closed position against the casing body 2 by the lower doors 12, 14, so that all of the doors can be locked in place simply by locking the lower doors 12, 14 on the casing body 2, as can readily be understood from FIGS. 3, 4, 6 through 8.

Figure 3:
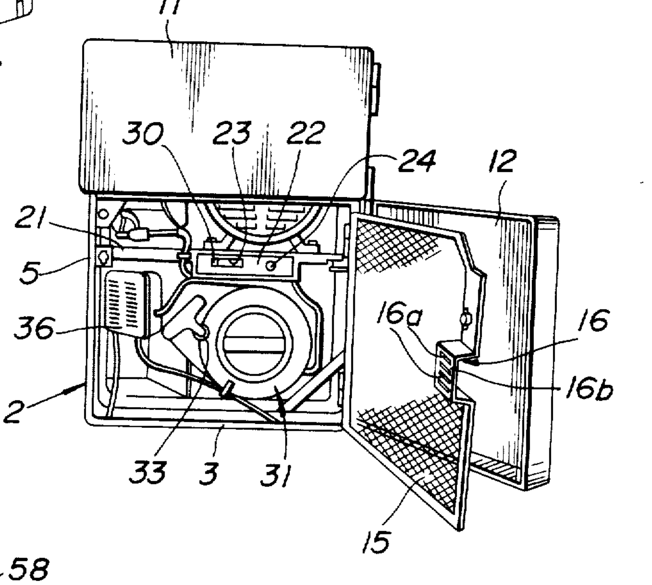
FIG. 3 is a front elevational view of the engine-operated machine with a lower door and a screen door open.
Figure 4:
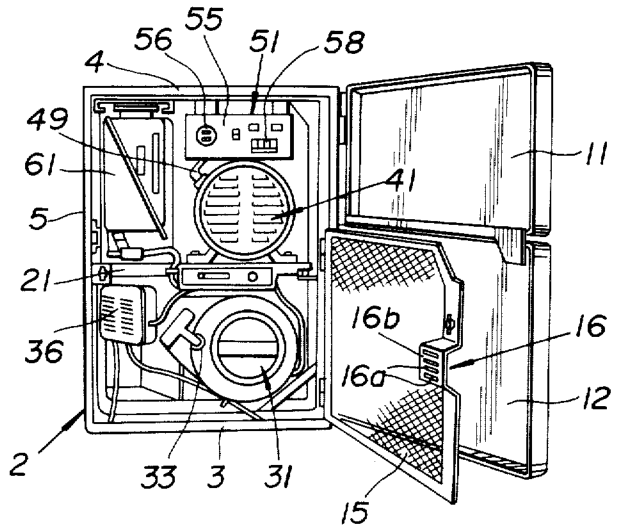
FIG. 4 is a front elevational view of the engine-operated machine with an upper door also open.
Figure 5:
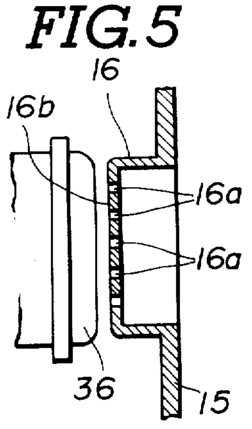
FIG. 5 is an enlarged fragmentary vertical cross-sectional view of a recessed portion of the screen door as positioned closely to an air cleaner.
Figure 6:
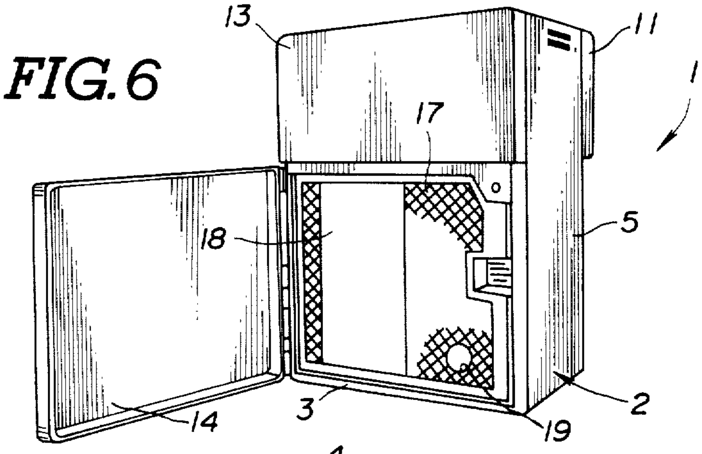
FIG. 6 is a perspective view of the engine-operated machine, showing the back thereof.
Figure 7:
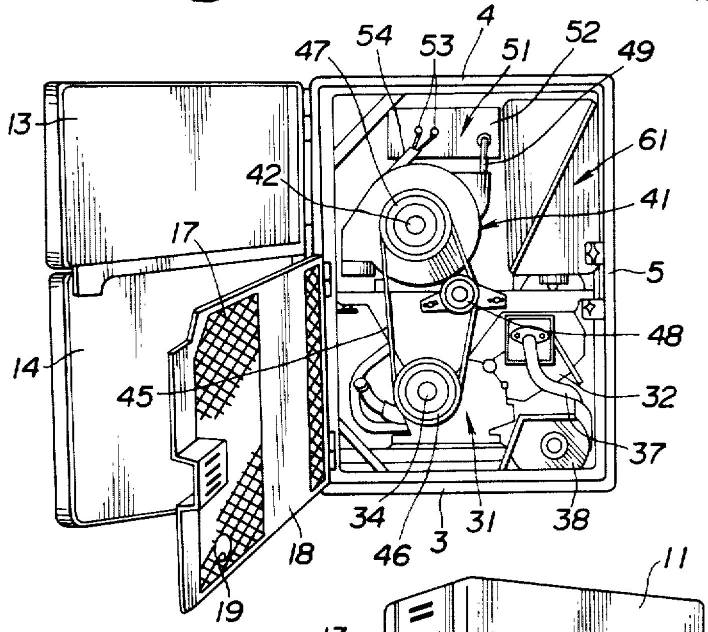
FIG. 7 is a rear elevational view of the engine-operated machine with upper, lower, and screen doors open.
Figure 8:
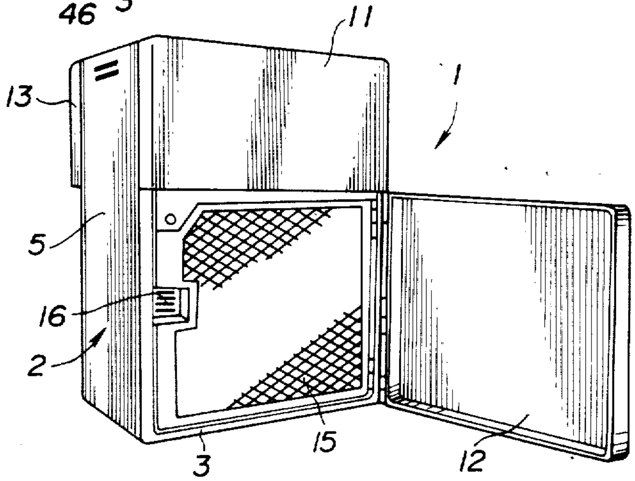
FIG. 8 is a perspective view of the engine-operated machine, showing the front thereof with the machine in operation.

As shown in FIGS. 3 through 5, the front screen door 15 has an integral recessed portion 16 with its bottom **16*b* disposed adjacent to the air inlet of an air cleaner 36 at the time the screen door 15 is closed. The recessed portion 16 has a number of slots 16*a*. As shown in FIGS. 6 and 7, a protective plate 18 is attached to the rear screen door 17 for protecting an endless belt 45, a pulley 46, and a tensioning roller 48 when the rear screen door 17 is closed. The rear screen door 17 has an exhaust hole 19 defined at a position aligned with a muffler 38 when the rear screen door 17** is closed.

The casing body 2 is divided by a horizontal intermediate bed 21 into upper and lower chambers. An internal combustion engine 31 is disposed in the lower chamber below the bed 21. An engine-operated machine unit 41 such as an electric generator is mounted on the bed 21 in the upper chamber, and a fuel tank 61 is positioned adjacent to the generator 41 in the upper chamber.

More specifically, the bed 21 extends horizontally between and is supported substantially vertically centrally by rubber mounts on the side panels 5, 6. The engine 31 is suspended from the bed 21, and the generator 41 is installed on the bed 21 directly above the engine 31. The engine 31 can be started by a recoil starter 33 (FIGS. 3 and 4) positioned closely to the front opening of the casing 1. The engine 31 has an output shaft 34, and the generator 41 has an input shaft 42, the output and input shafts 34, 42 being positioned closely to the rear opening of the casing 1 as shown in FIG. 7. The pulley 46 and a pulley 47 are fixed to the output and input shafts 34, 42, respectively, and the endless belt 45 is trained around the pulleys 46, 47 to operatively connect the output and input shafts 34, 42. The endless belt 45 and the pulleys 46, 47 thus jointly constitute a power transmission assembly. The endless belt 45 is tensioned by the tensioning roller 48 mounted on the bed 21.

The engine 31 has a cylinder 32 tilted laterally toward the side panel 5, and a carburetor (not shown) and the air cleaner 36 which are disposed closely to the front opening of the casing 1. An exhaust pipe 37 extends rearwardly from the engine cylinder 32 and is connected to the muffler 38 disposed closely to the rear opening of the casing 1 in a space below the tilted cylinder 32. As illustrated in FIG. 3, a control lever 30 for starting, stopping, and controlling the operation of the engine 31 is positioned in a horizontal slot 23 defined in a laterally extending, vertical plate 22 attached to the front surface of the bed 21. The plate 22 supports an oil warning lamp 24 thereon which is turned on when the engine runs short of engine oil.

A control box 51 is disposed in the upper chamber above the generator 41 as shown in FIGS. 4 and 7. As shown in FIG. 7, an input cord 49 extending from the generator 41 is connected to the rear wall 52 of the control box 51. An output cord 54 connected between output terminals 53 on the rear wall 52 extends out of the casing 1 through the lower panel 3 thereof. As illustrated in FIG. 4, the control box 51 has a front wall 55 supporting thereon an output terminal or plug socket 56 and a display 58 including a frequency indicator, a clock, and the like.

The fuel tank 61 is disposed on one side of the generator 41 and the control box 51, the fuel tank 61 being removable as a cartridge out of the casing 1 as described later on.

Figure 9:
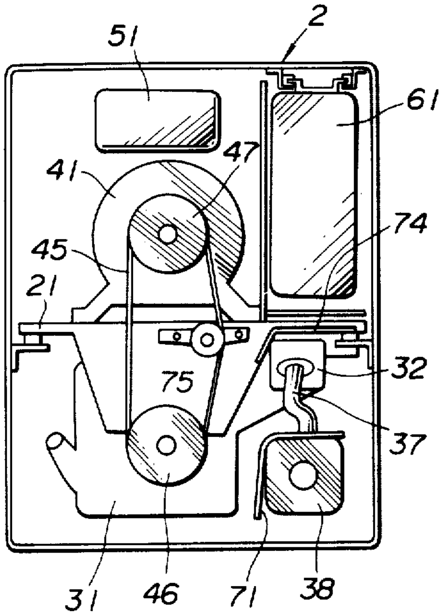
FIG. 9 is a rear elevational view of the internal mechanism of the engine-operated machine.
Figure 10:
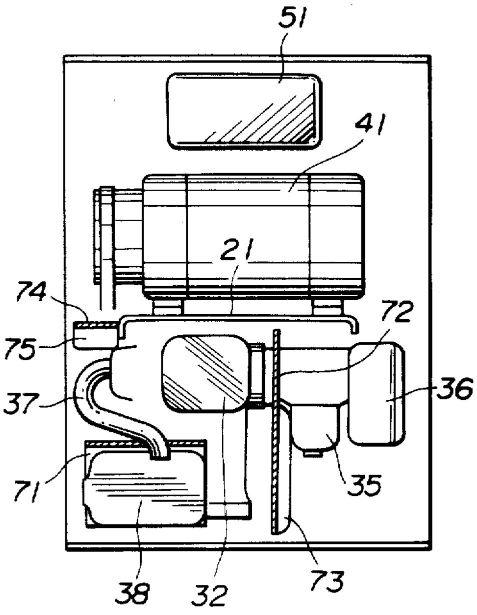
FIG. 10 is a side elevational view showing a thermal insulation structure.

FIGS. 9 and 10 schematically show the layout of the internal mechanism as described above, and FIG. 11 illustrates the internal mechanism in perspective.

As shown in FIG. 10, the muffler 38 which is heated to high temperature when the engine-operated machine is in operation is isolated from the other components by a muffler separator 71 comprising a mat of glass wool. In addition, the cylinder 32, and the exhaust system comprising the exhaust pipe 37 and the muffler 38 are isolated from the air intake system comprising the carburetor 35 and the air cleaner 36 by a carburetor separator 72 composed of a mat of asbestos. Specifically, the separator 72 is vertically disposed in front of the cylinder 32 and has a pair of lateral members 73 curved in slightly covering relation to the carburetor 35 on its rear side.

As shown in FIG. 9, an exhaust pipe separator 74 in the form of a metal plate is positioned above the exhaust pipe 37. The separator 74 extends as a hood over the exhaust pipe 37 upwardly of the rear side of the cylinder 32. The separator 74 has one side 75 curved in an overhanging and covering relation to the exhaust pipe 37.

Figure 11:
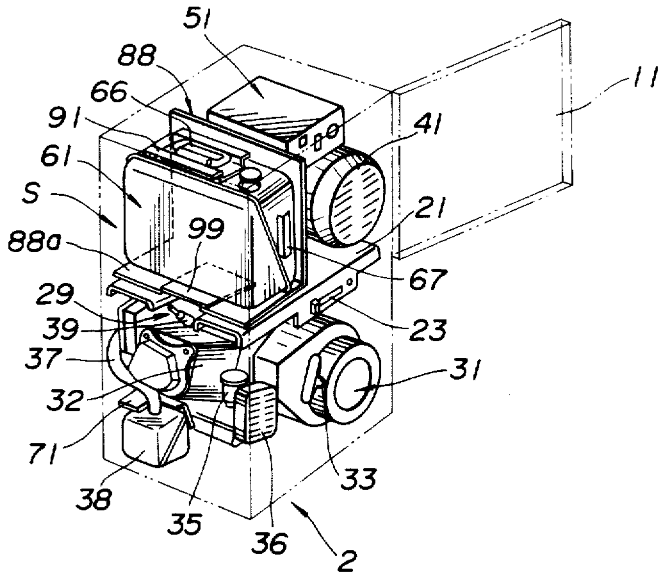
FIG. 11 is a perspective view of the internal mechanism of the engine-operated machine.
Figure 12:
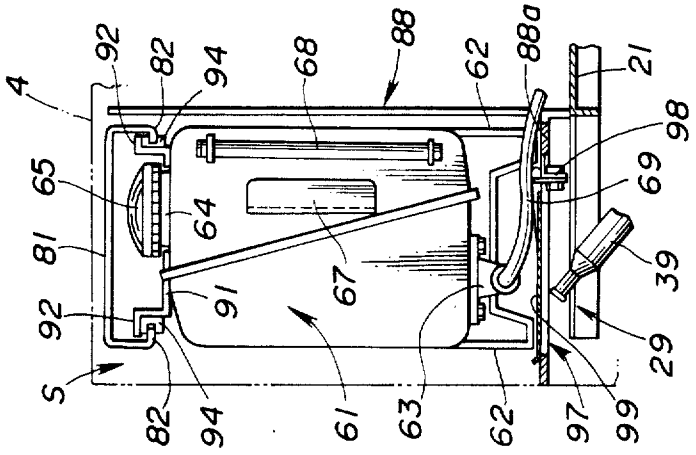
FIG. 12 is an enlarged front elevational view of a fuel tank housing construction.
Figure 13:
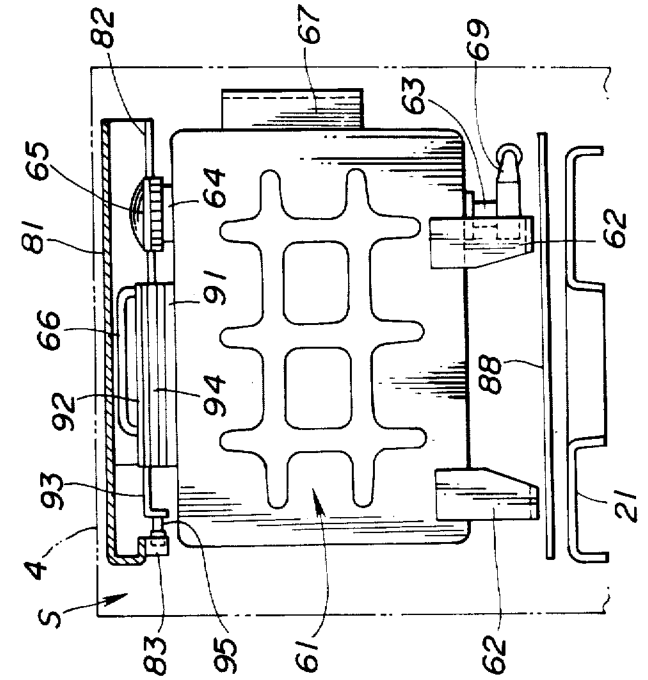
FIG. 13 is an enlarged side elevational view of the fuel tank housing construction.

The housing construction for the fuel tank 61 is illustrated in detail in FIGS. 11 through 13. A tank separator 88 having a substantially L-shaped cross section is disposed in the upper chamber above the bed 21 to define a fuel tank housing space S. A rail plate 81 attached to the lower surface of the upper panel 4 has a pair of integral rails 82 spaced laterally from each other and extending parallel to the side panels 5, 6 of the casing 1. A catching roller assembly 83 composed of a pair of rollers which are normally urged in a direction toward each other is mounted on the rear end of the rail plate 81.

As shown in FIGS. 12 and 13, the fuel tank 61 comprises a container in the form of a rectangular parallelepiped which is vertically elongate as seen from the front side of the casing 1 and horizontally elongate as seen from the lateral side of the casing 1. The fuel tank 61 has four legs 62 extending downwardly from the lower portion thereof, a fuel hose joint 63 mounted on the lower surface thereof, and a fuel inlet 64 mounted on the upper surface thereto. When the fuel tank 61 is housed in the casing 1, the fuel hose joint 63 and the fuel inlet 64 are positioned closely to the front opening of the casing 1. A fuel supply hose 69 connected to the engine 31 is coupled to the fuel hose joint 63. The fuel inlet 64 is closed by a fuel tank cap 65. The fuel hose joint 63 comprises a fuel cock which supplies fuel from the fuel tank 61 through the fuel hose joint 63 to the engine 31 when the fuel supply hose 69 is connected, and stops the fuel supply when the fuel supply hose 69 is disconnected. With the fuel tank 61 installed in position, the fuel hose joint 63 is protected by the legs 62 from contact by other components.

An arch-shaped grip 66 is attached centrally to the upper surface of the fuel tank 61 for the user to carry the fuel tank 61 therewith. An angle-shaped grip 67 is attached to the front side of the tank 61 for enabling the user to pull the fuel tank 61 out of the casing 1. A fuel gauge 68 is also attached to the front side of the fuel tank 61 adjacent to the angle-shaped grip 67.

A bracket 91 is fixed centrally to the upper surface of the fuel tank 61 and extends transversely thereof. The bracket 91 has a pair of transversely spaced guide shoes 94, 94 held in slidable engagement with the rails 82, 82, respectively. The bracket 91 also has a rear member 93 from which a locking pin 95 extends rearwardly for engagement with the catching roller assembly 83.

The bed 21 has a square opening 29 defined therein above the head of the tilted cylinder 32 of the engine 31 and below the fuel tank housing space S. An ignition plug 39 mounted on the head of the cylinder 32 projects upwardly into the opening 29. The tank separator 88 includes a horizontal portion **88*a* lying immediately above the ignition plug 39 and having an opening 97 defined therein. The opening 97 can be opened and closed by a maintenance lid 99 angularly movably mounted by a hinge 98 to the horizontal portion 88*a***.

For refueling the engine-operated machine, the front upper door 11 is opened and the fuel supply hose 69 is detached from the fuel hose joint 63. The grip 67 is manually pulled to remove the fuel tank 61 from the rails 82, and then the grip 66 is held to place the fuel tank 61 on the ground or other base. A similar fuel tank 61 filled with fuel is manually placed into the casing 1 along the rails 82 until the locking pin 95 is engaged by the catching roller assembly 83. Thereafter, the fuel supply hose 69 is joined to the fuel hose joint 63.

Since the fuel tank 61 is easily removable laterally from the case 1, it can simply be replaced with a spare fuel tank filled with fuel. Therefore, the generator 41 can be operated continuously through the simple refueling procedure.

For servicing the ignition plug 39, the grip 67 is pulled to take the fuel tank 61 out of the casing 1, and the maintenance lid 99 is manually lifted to open the openings 97, 29. The plug cap (not shown) is manually removed through the openings 97, 29, and then the iginion plug 39 is detached for inspection, repair, or replacement. The ignition plug 39 can be attached and the fuel tank 61 installed in a process which is the reversal of the above disassembling process.

With the generator 41 housed in the box-shaped casing 1, the overall engine-operated machine can be fastened to a utility pole or mounted on a dedicated post by brackets 7 attached to the side panel 6 of the casing 1, so that the engine-operated machine can be placed in a relatively high position for use as an emergency generator for signal lamps, for example. The brackets 7 may be dispensed with as desired where the engine-operated machine is installed in different environments.

When the engine-operated generator assembly is to be operated, the upper doors 11, 13 are closed, the lower doors 12, 14 are open, and the screen doors 15, 17 are closed.

The engine-operated machine according to the present invention has the following advantages:

Since the engine 31 is positioned below the generator 41, the overall area of the bottom of the machine is relatively small. Since the engine cylinder 32 is tilted laterally toward the side panel 5, the entire height of the machine is small. The muffler 38 is positioned in the space beneath the tilted cylinder 32. Accordingly, the machine is compact as a whole, and small in size.

Inasmuch as the lower doors 12, 14 are open and the screen doors 15, 17 are closed during operation of the engine 31, the interior of the box-shaped casing 1 is cooled by cool air introduced through the screen doors 15, 17 without trapping an undesirable amount of heat in the casing 1. The engine 1 can therefore be cooled properly. The screen doors 15, 17 as closed protect the internal mechanism from being tampered with.

Because the recessed portion 16 of the screen door 15 is positioned adjacent to the air inlet of the air cleaner 36 when the screen door 15 is closed, fresh air can directly be introduced via the slots **16*a* into the air cleaner 36 while preventing heated air which circulates inside of the screen door 15 from flowing into the air cleaner 36**.

When the machine is not in operation, the lower doors 12, 14 are also closed to completely cover the internal mechanism for thereby preventing rain, wind, and other unwanted foreign matter from entering the casing 1.

The internal mechanism of the machine can easily be serviced simply by opening the screen doors 15, 17 and the upper doors 11, 13.

The cylinder 32, the exhaust pipe 37, and the muffler 38 are thermally insulated from the carburetor 35 and the air cleaner 36 by the separator 72. Therefore, the air intake and exhaust systems can be placed closely to each other, with the result that the compactness or packing density of the machine can further be increased.

The cylinder 32, the exhaust pipe 37, and the muffler 38 are exposed to the exterior with the lower door 14 open, and the carburetor 35 and the air cleaner 36 are exposed to the exterior with the lower door 12 open. Therefore, the cylinder 32 and the exhaust system, and the air intake system are exposed in opposite directions, so that the air heated by the cylinder 32 and the exhaust system will not reach the air intake system directly.

The hood-like separator 74 hanging over the exhaust pipe 37 serves to thermally insulate the fuel tank 61 thereabove, thus reducing undesirable thermal influence on the upper chamber of the casing 1.

Since the fuel tank 61 can slidably be removed laterally from the casing 1, the engine-operated machine can easily be refueled even when it is installed in an elevated position. The detachable fuel tank 61 allows the required fuel to be simply carried to the machine.

When the generator is not to be used for an extended period of time, the fuel tank 61 may be removed from the casing 1.

The ignition plug 39 can easily be detached and attached through the space of a relatively low temperature defined by the tank separator 88, Therefore, no dedicated opening in its lid is required in the casing 1 for detaching and attaching the ignition plug 39.

Figure 14:
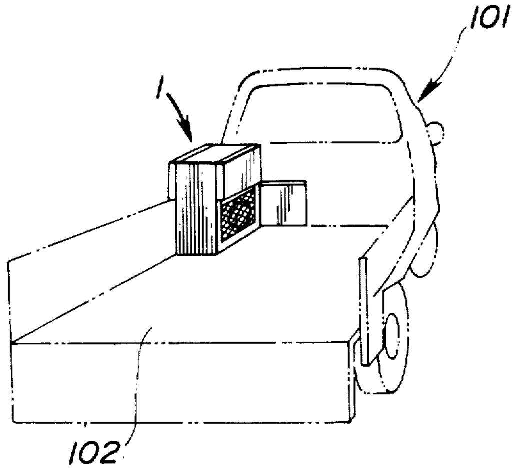
FIG. 14 is a perspective view of the engine-operated machine as installed on the bed of a truck.
Figure 15:
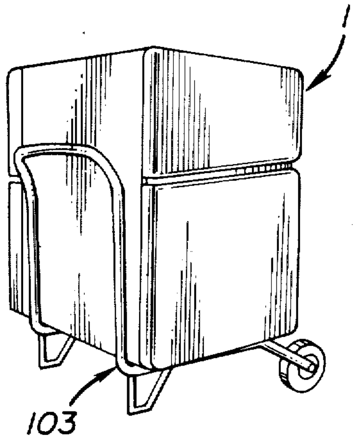
FIG. 15 is a prespective view of the engine-operated machine as carried on a cart.
Figure 2:
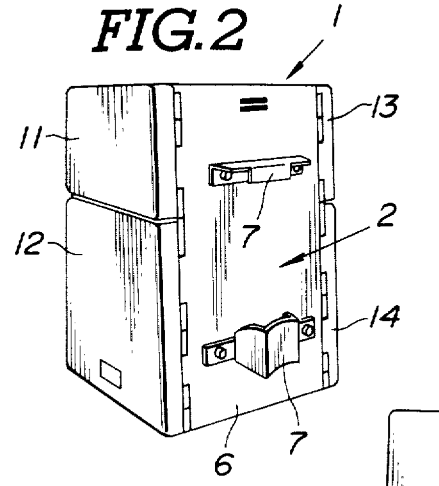
FIG. 2 is a perspective view of the box-shaped casing.

The boxed-shaped casing 1 is in the form of a vertical elongate rectangular parallelepiped, and the upper and lower doors 11, 12 on one side and the upper and lower doors 13, 14 on the other lie substantially flush with each other. When the vertically elongate box-shaped casing 1 is fixedly mounted on the bed 102 of a truck 101 as shown in FIG. 14, the casing 1 takes up only a small space on the bed 102. The casing 1 can also be carried on a cart 103 as shown in FIG. 15, so that the engine-operated machine can easily be transported or moved around by the cart 103.

The box-shaped casing 1 allows the engine-operated machine to be installed in a corner or closely against a wall. The engine-operated machine of the invention is therefore a space saver and permits an easy layout in various applications. When not in use, the machine can also be stored in a small space.

In the illustrated embodiment the engine-operated generator has been described as a typical application of the engine-operated machine of the present invention. However, the present invention is also applicable to various other engine-operated machines such as a compressor, a pump, or the like. Each of the upper doors may be subdivided into door members.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed:

1. An engine-operated machine comprising:

a box-shaped casing including a casing body having front and rear openings, at least a pair of upper doors mounted on said casing body for opening and closing upper portions of said front and rear openings, respectively, at least a pair of lower doors mounted on said casing body below said upper doors for opening and closing lower portions of said front and rear openings, respectively, independently of said upper doors, and a pair of screen doors mounted on said casing body inwardly of said lower doors, respectively, for opening and closing said lower portions of said front and rear openings, respectively, wherein when said engine-operated machine is in operation, said lower doors are open, and said upper doors and said screen doors are closed, said box-shaped casing further including a bed member dividing an interior of said box-shaped casing into upper and lower chambers;

an engine having an output shaft and disposed in said lower chamber of said box-shaped casing below said bed member;

an air cleaner associated with said engine, said air cleaner being disposed closely to said front opening in said lower portion of the boxed-shaped casing, said air cleaner having an air inlet positioned adjacent to said screen door where said screen door closes said front opening, said screen door having a recessed portion with a bottom thereof adjacent to said air inlet;

a machine unit having an input shaft and being mounted on said bed member in said upper chamber of said box-shaped casing; and a power transmission assembly by which said input shaft of said machine unit is operatively coupled to said output shaft of said engine.

2. An engine-operated machine according to claim 1, wherein said box-shaped casing is in the form of a vertically elongate rectangular parallelepiped and entirely covers said engine, said machine unit, and said power transmission assembly, said upper and lower doors having outer surfaces lying substantially flush with each other when they close each of said front and rear openings.

3. An engine-operated machine according to claim 1, wherein said machine unit comprises an electric generator.

4. An engine-operated machine comprising:

a box-shaped casing including a casing body having a pair of side panels and front and rear openings therebetween, and at least a pair of doors mounted on said casing body for opening and closing said front and rear openings, respectively, said box-shaped casing further including a lower panel and a bed member dividing an interior of said box-shaped casing into upper and lower chambers;

an engine having an output shaft and being disposed below said bed member in said lower chamber of said box-shaped casing, said engine having a cylinder tilted toward one of said side panels;

a machine unit having an input shaft and being mounted on said bed member in said upper chamber of said box-shaped casing;

a power transmission assembly by which said input shaft of said machine unit is operatively coupled to said output shaft of said engine; and a muffler disposed in a space defined between said tilted cylinder and said lower panel.

5. An engine-operated machine according to claim 4, wherein an exhaust system is connected to said engine and includes said muffler, and an air intake system is connected to said engine, and a separator is disposed in said lower portion of said casing body and insulates said engine and said exhaust system from said air intake system, said engine and said exhaust system are exposed to the exterior when one of said pair of doors opens and said air intake system is exposed to the exterior in opposite direction to said exhaust system when the other of said pair of doors opens.

6. An engine-operated machine comprising:

a box-shaped casing including a bed dividing the interior thereof into upper and lower chambers, said casing including a casing body and a door mounted on said casing body for laterally opening and closing said upper chamber;

a fuel tank disposed above said bed in said upper chamber, said fuel tank being slidably movable laterally into and out of said upper chamber when said door is open; and an engine disposed below said bed in said lower chamber and having a cylinder including a head, said bed having an opening defined therein above said head, said head having an ignition plug disposed in said opening, said fuel tank being slidably disposed above said opening, said ignition plug is easy to access by slidably moving said fuel tank out of said upper chamber.

7. An engine-operated machine according to claim 6, including a machine unit disposed on said bed adjacent to said fuel tank and operable by said engine.

8. An engine-operated machine according to claim 7, wherein said machine unit comprises an electric generator.

* * * * *

UNITED STATES PATENT AND TRADEMARK OFFICE

CERTIFICATE OF CORRECTION

PATENT NO. : 4,698,975

DATED : October 13, 1987

INVENTOR(S) : Teisuke TSUKAMOTO et al

It is certified that error appears in the above-identified patent and that said Letters Patent is hereby corrected as shown below:

On the cover page, Item [75], after "Shoichi Kato, both of Saitama" the following names should appear: --Toshio Suzuki, Tokyo, Toshio Ebihara, Saitama--.

Signed and Sealed this

Twenty-eighth Day of June, 1988

*Attest:*

DONALD J. QUIGG

*Attesting Officer*

*Commissioner of Patents and Trademarks*